(12) United States Patent  (10) Patent No.: US 9,013,535 B2
Sakai et al.  (45) Date of Patent: Apr. 21, 2015

(54) INFORMATION PROCESSING APPARATUS, INFORMATION PROCESSING SYSTEM AND INFORMATION PROCESSING METHOD

(75) Inventors: Yusuke Sakai, Kanagawa (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 69 days.

(21) Appl. No.: 13/876,294

(22) PCT Filed: Oct. 3, 2011

(86) PCT No.: PCT/JP2011/005567
§ 371 (c)(1),
(2), (4) Date: Mar. 27, 2013

(87) PCT Pub. No.: WO2012/046432
PCT Pub. Date: Apr. 12, 2012

(65) Prior Publication Data
US 2013/0314489 A1  Nov. 28, 2013

(30) Foreign Application Priority Data
Oct. 4, 2010 (JP) .................. 2010-224959

(51) Int. Cl.
*H04N 7/15* (2006.01)
*G06F 3/042* (2006.01)
*H04N 7/14* (2006.01)

(52) U.S. Cl.
CPC .................. *H04N 7/15* (2013.01); *G06F 3/042* (2013.01); *H04N 7/147* (2013.01)

(58) Field of Classification Search
CPC ........... H04N 7/147; H04N 7/15; G06F 3/042
USPC ................. 345/156, 157, 173, 175, 420, 158; 348/14.03, 231.2, 552, 169, 365; 358/1.15; 370/254, 400, 546; 375/240.08; 382/154, 188, 291; 709/206; 725/28, 62; 341/22; 353/42
See application file for complete search history.

(56) References Cited

U.S. PATENT DOCUMENTS 5,572,251 A * 11/1996 Ogawa .................... 348/207.99
(Continued)

FOREIGN PATENT DOCUMENTS

JP  2003316510 A  11/2003
JP  2004297448 A  10/2004
JP  2007310620 A  11/2007

OTHER PUBLICATIONS

International Search Report for Application No. PCT/JP2011/005567, dated Nov. 1, 2011.

*Primary Examiner* — Gerald Gauthier
(74) *Attorney, Agent, or Firm* — Lerner, David, Littenberg, Krumholz & Mentlik, LLP

(57) ABSTRACT

An information processing apparatus may include a detecting unit to detect a pointing object in a captured image, and a generation unit to generate pointing information based on detection of the pointing object by the detecting unit. The pointing information may indicate a position of the pointing object determined using a pointable range set based on a user in the captured image. The apparatus may further include a communication unit to transmit the pointing information to an external apparatus.

13 Claims, 19 Drawing Sheets

(56) References Cited

U.S. PATENT DOCUMENTS

| | | | |
|---|---|---|---|
| 5,687,333 A * | 11/1997 | Dobashi et al. | 715/705 |
| 6,265,993 B1 * | 7/2001 | Johnson | 341/22 |
| 6,766,066 B2 * | 7/2004 | Kitazawa | 382/291 |
| 6,910,778 B2 * | 6/2005 | Hamana et al. | 353/42 |
| 6,947,073 B1 * | 9/2005 | Seal | 348/169 |
| 7,286,706 B2 * | 10/2007 | Blaimberger et al. | 382/188 |
| 7,341,352 B2 * | 3/2008 | Katsuyama | 353/42 |
| 7,457,705 B2 * | 11/2008 | Takahashi et al. | 701/454 |
| 8,031,770 B2 * | 10/2011 | Lee et al. | 375/240.08 |
| 8,089,476 B2 * | 1/2012 | Ishiguro et al. | 345/175 |
| 8,144,241 B2 * | 3/2012 | Nemoto | 348/365 |
| 8,208,040 B2 * | 6/2012 | Nakase et al. | 348/231.2 |
| 8,212,793 B2 * | 7/2012 | Ishiguro | 345/175 |
| 8,259,063 B2 * | 9/2012 | Ting | 345/156 |
| 8,289,550 B2 * | 10/2012 | Shimma | 358/1.15 |
| 8,395,706 B2 * | 3/2013 | Toba | 348/552 |
| 8,441,480 B2 * | 5/2013 | Nagamine | 345/420 |
| 8,472,703 B2 * | 6/2013 | Takemoto et al. | 382/154 |
| 8,654,103 B2 * | 2/2014 | Ilmonen | 345/175 |
| 8,774,234 B2 * | 7/2014 | Sakamoto et al. | 370/546 |
| 8,907,889 B2 * | 12/2014 | Sweetser et al. | 345/156 |
| 2001/0030668 A1 * | 10/2001 | Erten et al. | 345/863 |
| 2007/0276690 A1 | 11/2007 | Ohtani et al. | |
| 2008/0174551 A1 * | 7/2008 | Ishibashi | 345/158 |
| 2008/0259051 A1 * | 10/2008 | Ota | 345/175 |
| 2010/0278071 A1 * | 11/2010 | Hattori | 370/254 |
| 2010/0329267 A1 * | 12/2010 | Sakamoto et al. | 370/400 |
| 2011/0043446 A1 * | 2/2011 | Spears et al. | 345/156 |
| 2011/0179442 A1 * | 7/2011 | Toba et al. | 725/28 |
| 2011/0209182 A1 * | 8/2011 | Wang et al. | 725/62 |
| 2011/0227876 A1 * | 9/2011 | Ilmonen | 345/175 |
| 2011/0285658 A1 * | 11/2011 | Homma et al. | 345/173 |
| 2012/0001848 A1 * | 1/2012 | Lu et al. | 345/157 |
| 2012/0306742 A1 * | 12/2012 | Liu | 345/156 |
| 2013/0144956 A1 * | 6/2013 | Sakai | 709/206 |
| 2013/0187854 A1 * | 7/2013 | Lee | 345/158 |
| 2013/0314489 A1 * | 11/2013 | Sakai et al. | 348/14.03 |

* cited by examiner

USER B

USER A

USER B

INFORMATION PROCESSING APPARATUS, INFORMATION PROCESSING SYSTEM AND INFORMATION PROCESSING METHOD

CROSS-REFERENCE TO RELATED APPLICATIONS

The present application is a national phase entry under 35 U.S.C. §371 of International Application No. PCT/JP2011/005567 filed Oct. 3, 2011, published in English as WO 2012/046432 A1, which claims priority from Japanese Patent Application No. 2010-224959 filed in the Japan Patent Office on Oct. 4, 2010, the entire content of which is hereby incorporated herein by reference.

TECHNICAL FIELD

The present disclosure relates to an information processing apparatus, an information processing system and an information processing method.

BACKGROUND ART

In the related art, a television conference system is known which transmits and receives images and audio sounds between a plurality of distant user terminals. By the way, there are some occasions in television conferences that images and audio sounds are transmitted and received referring to common image information displayed on a plurality of user terminals.

SUMMARY

Technical Problem

When a user points to an arbitrary position on image information for other users, a user terminal is operated to display a marker on a pointing position or the pointing position is notified by an audio sound. Therefore, there are cases where the user takes labor to point to an arbitrary position on image information for other users.

Accordingly, the disclosure provides an information processing apparatus, an information processing system and an information processing method which can readily point to an arbitrary position on image information for other users.

Solution to Problem

In accordance with an embodiment, an information processing apparatus may include a detecting unit to detect a pointing object in a captured image, and a generation unit to generate pointing information based on detection of the pointing object by the detecting unit. The pointing information may indicate a position of the pointing object determined using a pointable range set based on a user in the captured image. The apparatus may further include a communication unit to transmit the pointing information to an external apparatus.

In accordance with another embodiment, an information processing apparatus may include a communication unit to receive from an external apparatus pointing information including information of a pointing object in a captured image. The pointing information may indicate a position of the pointing object determined using a pointable range set based on a user in the captured image. The apparatus may further include a generation unit to control display on a display screen of a pointing image corresponding to the pointing information superimposed on a content image.

Advantageous Effects of Invention

The disclosure can provide an information processing apparatus, an information processing system and an information processing method which can readily point to an arbitrary position on image information for other users.

DESCRIPTION OF EMBODIMENTS

Figure 1:
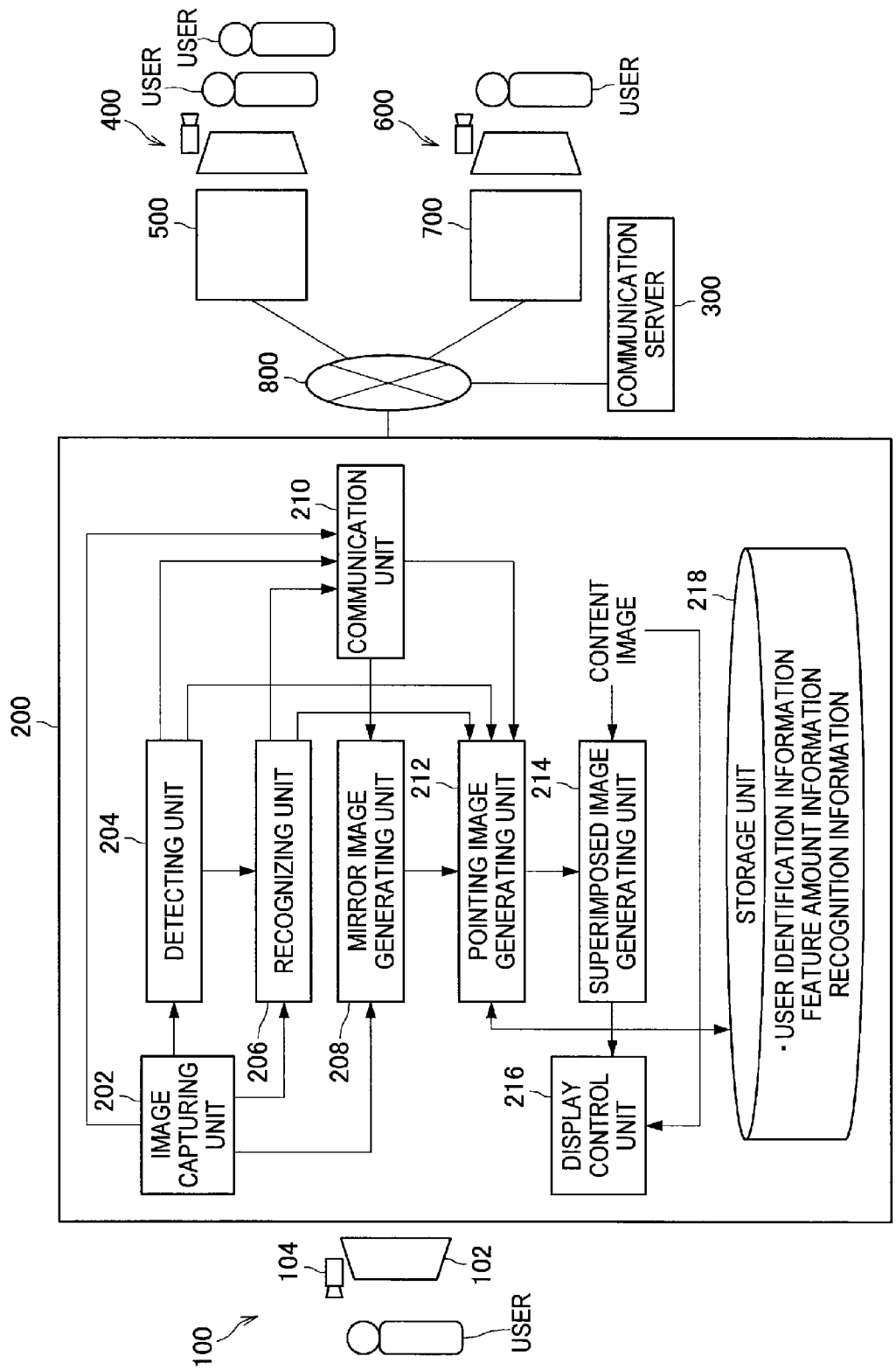
FIG. 1 is a block diagram illustrating a configuration of a television conference system according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 2:
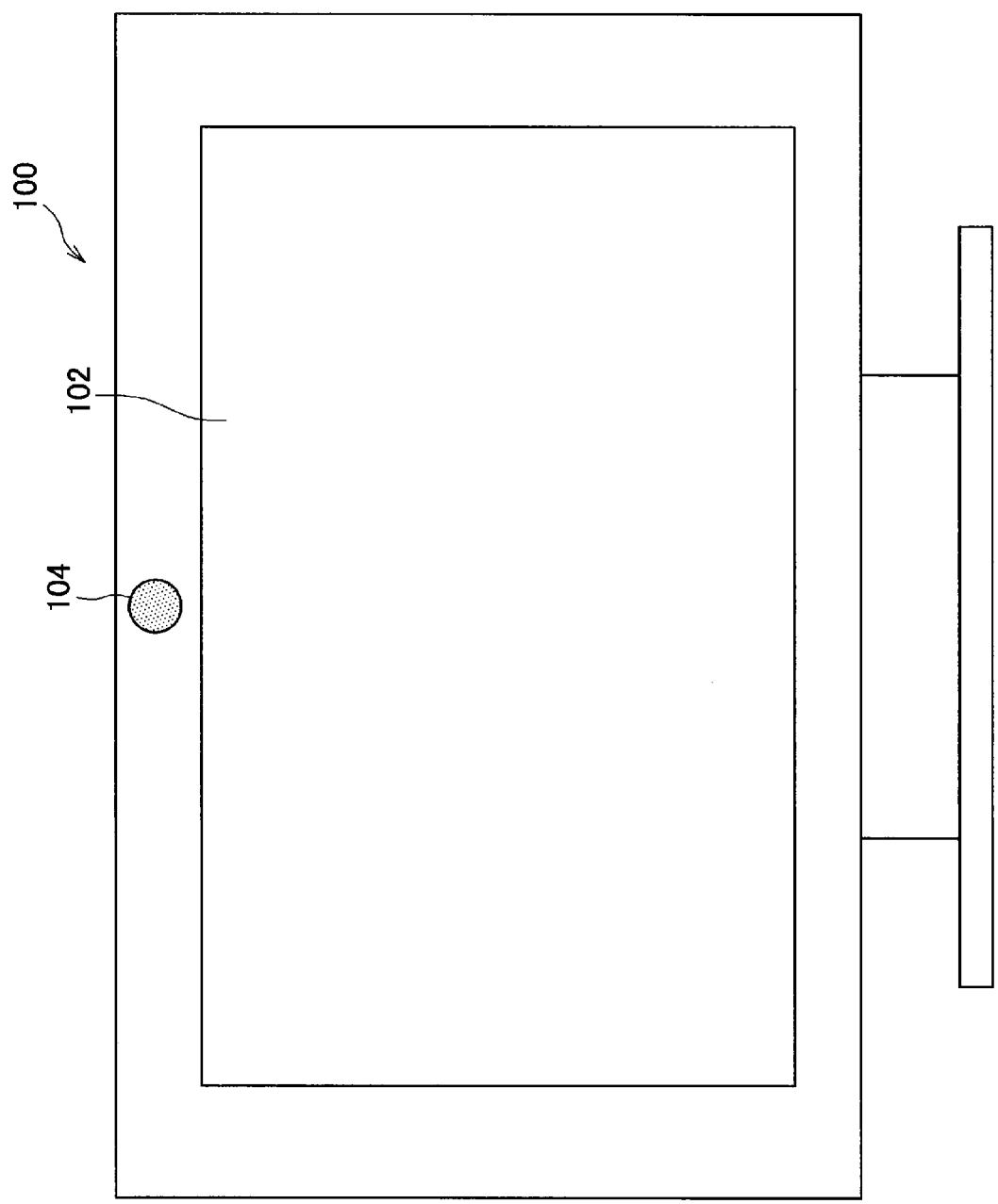
FIG. 2 is a view illustrating a configuration of a display system.

FIG. 1 is a block diagram illustrating a configuration of a television conference system (information processing system) according to an embodiment of the disclosure. As illustrated in FIG. 1, the television conference system includes a plurality of user terminals including a display system 100 and an information processing apparatus 200 connected to the display system 100. As illustrated in FIG. 2, the display system 100 includes a display apparatus 102 such as a display or projector, an image capturing apparatus 104 such as a video camera or still camera, and a speaker and microphone or the like (not illustrated).

For example, a first user terminal utilized by a user A includes the display system 100 and information processing apparatus 200. A second user terminal utilized by a plurality of other users include a display system 400 and an information processing apparatus 500. A third user terminal utilized by another user includes a display system 600 and an information processing apparatus 700. A plurality of user terminals are connected through a communication line 800 including a communication server 300.

The display apparatus 102 displays a content image IC, and the image capturing apparatus 104 captures an image of the user positioned in front of the display apparatus 102. The content image IC is an arbitrary image including a text, figure, symbol, image or a combination of these, and is displayed on an arbitrary image on a display screen of the display apparatus 102. The front of the display apparatus 102 means the front of the display screen of the display apparatus 102.

The information processing apparatus 200 includes a captured image input unit 202, a detecting unit 204, a recognizing unit 206, a mirror image generating unit 208, a communication unit 210, a pointing image generating unit 212, a superimposed image generating unit 214, a display control unit 216 and a storage unit 218.

The captured image input unit 202 receives an input of a captured image I1 capturing the user, from the image capturing apparatus 104. The captured image input unit 202 supplies the captured image I1 to the detecting unit 204, mirror image generating unit 208 and communication unit 210. The captured image I1 is an image capturing an object positioned in a predetermined range in front of the display apparatus 102, that is, in a range of an angle of view of the image capturing apparatus 104. Although the captured image I1 is a moving image, the captured image I1 may be a still image depending on cases. The user generally looks at the content image IC displayed on the display apparatus 102. Hence, the captured image I1 generally includes an image capturing a user's face F from nearly the front.

The detecting unit 204 detects the user's face F from the captured image I1, and generates position information indicating the position of the face F in the captured image I1 from the detection result. The detecting unit 204 selectively detects a pointing object H which the user uses to point to an arbitrary position, from the captured image I1, and generates position information indicating the position of the pointing object H in the captured image I1, from the detection result. The detecting unit 204 supplies the detection result to the recognizing unit 206, communication unit 210 and pointing image generating unit 212, and supplies position information to the communication unit 210 and pointing image generating unit 212. The detecting unit 204 detects the user's face F and pointing object H using a common image detection technique based on feature amount information stored in, for example, the storage unit 218. The pointing object H refers to a part of the body or a tool such as the user's finger of the hand, palm of the hand, the back of the hand or pointing stick which is generally used to point to an arbitrary position.

The recognizing unit 206 recognizes the user from the detection result of the face F, and selectively recognizes the shape of the pointing object H from the detection result of the pointing object H. The recognizing unit 206 supplies the recognition result to the communication unit 210 and pointing image generating unit 212. The recognizing unit 206 recognizes the user and shape of the pointing object H using a common image recognition technique, based on recognition information stored in, for example, the storage unit 218. The shape of the pointing object H refers to the shape of the hand or orientation of the hand of the user, and is used to determine a display mode of a pointing image I3 although described below. In addition, the recognizing unit 206 may be removed if the user and pointing object H are not recognized.

The mirror image generating unit 208 generates a mirror image I2 from the captured image I1 to supply to the pointing image generating unit 212. The mirror image generating unit 208 also generates a mirror image I2 of a captured image I1 of another user. The mirror image I2 means an image which is a mirror image in which the left and right of the captured image I1 are reversed.

The communication unit 210 functions as a transmitting unit which transmits the captured image I1 of the user, detection result, recognition result and position information, to other user terminals through the communication line 800. Further, the communication unit 210 functions as a receiving unit which receives the captured image I1 of another user, detection result, recognition result and position information, from another user terminal through the communication line 800. The communication unit 210 encodes the captured image I1 supplied from the captured image input unit 202 to transmit, and decodes the received encoded data to the captured image I1 to supply to the mirror image generating unit 208.

The pointing image generating unit 212 generates the pointing image I3 based on the detection result, recognition result, position information and mirror image I2 to supply to the superimposed image generating unit 214. The pointing image generating unit 212 also generates the pointing image I3 of the captured image I1 of another user. The pointing image generating unit 212 selectively generates the pointing image I3 using user identification information stored in the storage unit 218.

The pointing image I3 includes information which enables a pointing position which the user points to by means of the pointing object H to be specified, and information which enables the user to be identified. The information which enables the pointing image to be specified refers to, for example, an image of the pointing object H included in the captured image I1, and an image showing the pointing position specified from the detection result of the pointing object H. The information which enables the user to be identified refers to, for example, an image of the user's face F included in the captured image I1, and identification information assigned to the user (for example, user's name and character). Further, the details of the pointing image I3 will be described below.

The superimposed image generating unit 214 generates a superimposed image I4 based on the content IC, pointing image I3 and position information to supply to the display control unit 216. The superimposed image generating unit 214 may generate the superimposed image I4 including the pointing images I3 of the user and another user, and may generate the superimposed image I4 including only the pointing image I3 of another user depending on cases. The superimposed image I4 refers to an image in which the pointing image I3 is superimposed on the content image IC displayed on the display apparatus 102, based on position information. In addition, the details of the superimposed image I4 will be described below.

The display control unit 216 displays the content image IC on the display apparatus 102. Further, the display control unit 216 makes the display apparatus 102 display the superimposed image I4 in which the pointing image I3 is superimposed on the content image IC. The storage unit 218 stores feature amount information used to detect the user's face F and pointing object H. The storage unit 218 stores recognition information used to recognize the user and shape of the pointing object H. The storage unit 218 stores, for example, images used to generate the pointing image I3 (for example, images showing pointing positions and characters representing users) and text (for example, users' names).

In addition, with the configuration illustrated in FIG. 1, images are detected and recognized using the captured image I1. However, instead of the captured image I1, images may be detected and recognized using the mirror image I2. In this case, information used to detect and recognize images is prepared to match the mirror image I2.

Further, with the configuration illustrated in FIG. 1, the detection result, recognition result and position information are transmitted to another user terminal together with the captured image I1. However, by transmitting only the captured image I1 (or mirror image I2) to another user terminal, the user terminal which has received the captured image I1 may detect and recognize images and generate position information. Further, by transmitting only the captured image I1 (or mirror image I2) to the communication server 300, the communication server 300 which has received the captured image I1 (or mirror image I2) may detect and recognize images and generate position information, and transmit a processing result to other user terminals.

Figure 3:
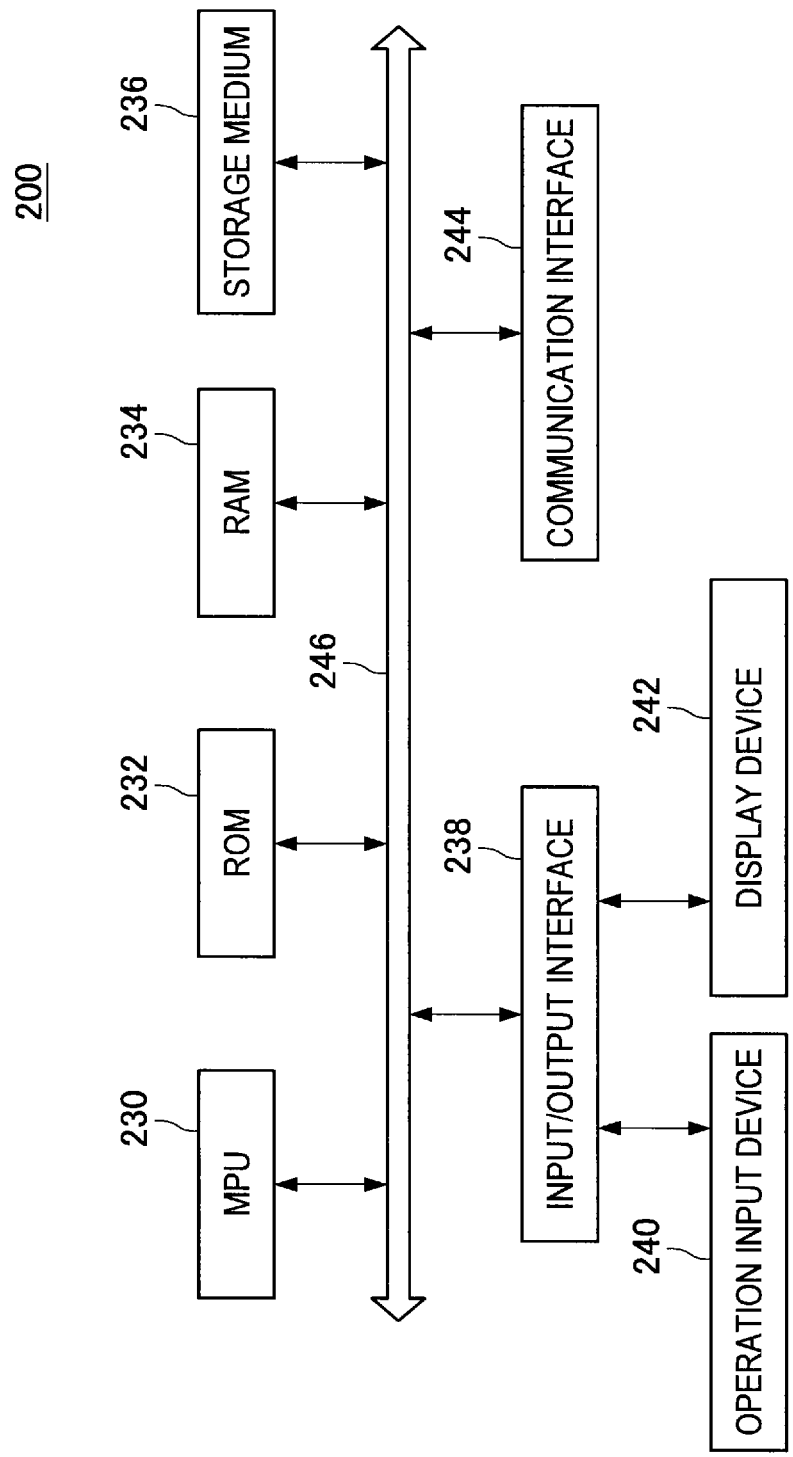
FIG. 3 is a block diagram illustrating a hardware configuration of an information processing apparatus.

FIG. 3 is a block diagram illustrating a hardware configuration of the information processing apparatus 200. As illustrated in FIG. 3, the information processing apparatus 200 includes a MPU 230, a ROM 232, a RAM 234, a storage medium 236, an input/output interface 238, an operation input device 240, a display device 242, a communication interface 244 and a bus 246. The bus 246 connects the MPU 230, ROM 232, RAM 234, storage medium 236, input/output interface 238, and communication interface 244.

The MPU 230 reads a program stored in, for example, the ROM 232, RAM 234 and storage medium 236, expands the program on the RAM 234 and executes the program to control the operation of the information processing apparatus 200. The MPU 230 functions particularly as the detecting unit 204, recognizing unit 206, mirror image generating unit 208, pointing image generating unit 212, superimposed image generating unit 214 and display control unit 216. The RAM 234 functions as the storage unit 218.

The input/output interface 238 inputs and outputs, for example, data to and from an AV system. The input/output interface 238 functions particularly as the captured image input unit 202 and display control unit 216. The operation input device 240 includes, for example, a keyboard, mouse and touch panel, and supplies operation information input through the device, to the MPU 230 through the input/output interface 238. The display device 242 displays, for example, image information and text information indicating the operation state of the system. The communication interface 244 transmits and receives, for example, data between the communication server 300 and other information processing apparatuses 500 and 700 through the communication line 800. The communication interface 244 functions as particularly as the communication unit 210.

Figure 4:
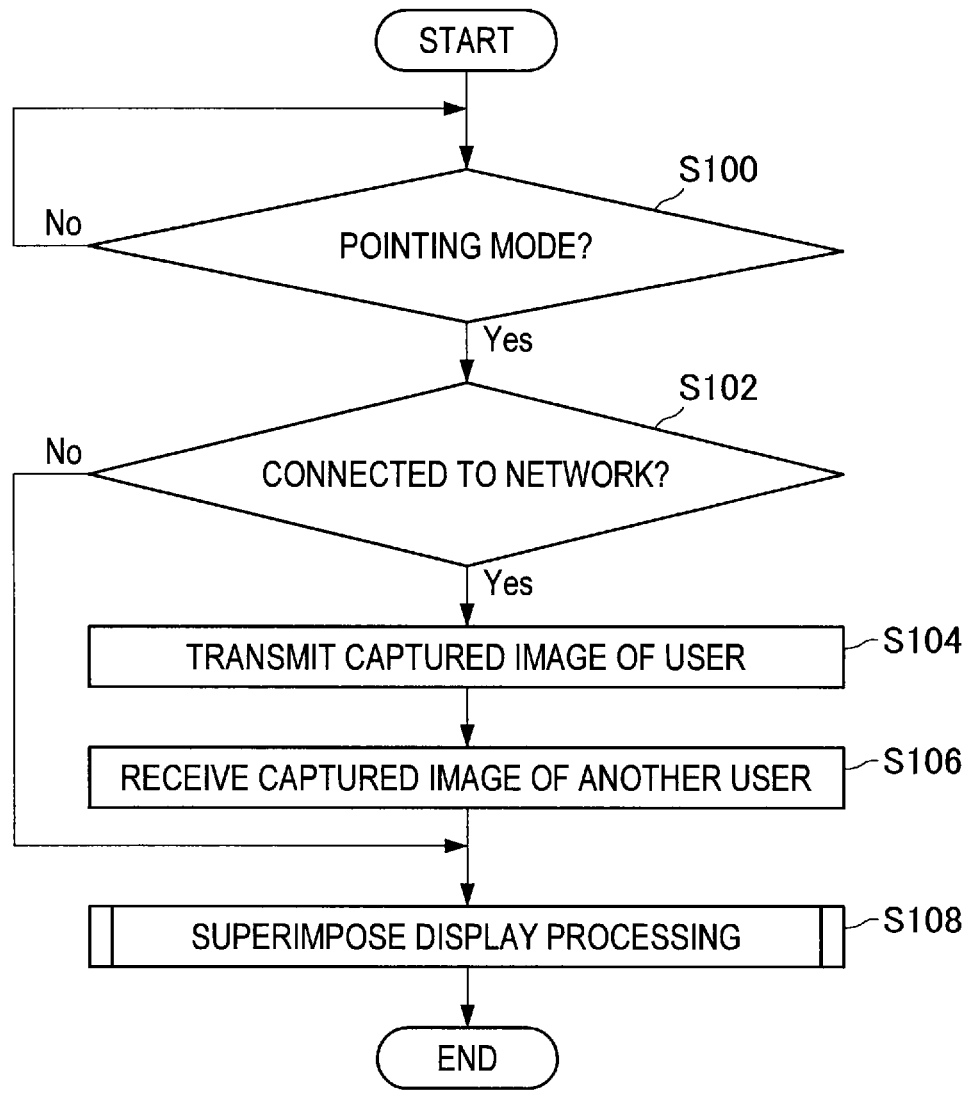
FIG. 4 is a flowchart (1/2) illustrating a procedure of a basic operation of a television conference system.
Figure 5:
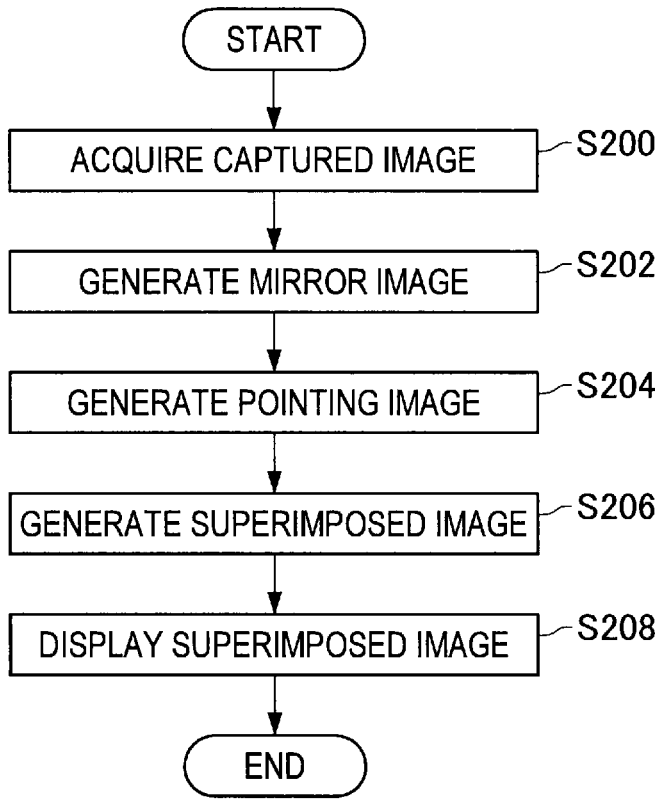
FIG. 5 is a flowchart (2/2) illustrating a procedure of a basic configuration of a television conference system.

FIG. 4 and FIG. 5 are flowcharts illustrating a procedure of a basic operation of a television conference system. FIG. 4 and FIG. 5 illustrate the procedure of pointing to an arbitrary position on the content image IC in a state where a common content image IC is displayed on a plurality of user terminals. In addition, the operation of pointing to an arbitrary position on the content image IC is also referred to as "pointing operation". Hereinafter, although a case will be described where a pointing operation is performed between the user terminal A of the user A and the user terminal B of the user B, a case will be described in the same manner where the pointing operation is performed among three or more user terminals.

First, the user terminal A decides whether or not the user A selected a pointing mode (step S100). The pointing mode may be selected by operating the user terminal A or selected by inputting a predetermined gesture. When the pointing mode is selected, the user terminal A decides that network connection is established with another user terminal, in this case, the user terminal B (step S102). Further, if connection to the network is not established, processing in step S108 is executed, and, if connection to the network is established, processing in step S104 is executed.

First, referring to FIG. 6A to FIG. 11, an operation when it is decided in step S102 that connection to the network is not established will be described. FIG. 6A to FIG. 6D are views illustrating examples of generating the superimposed image I4 including the pointing image I3 of the user. In addition, a case will be described in the same manner where the superimposed image I4 including, for example, a pointing image Ia3 of the user A (described below) is generated.

Figure 6A:
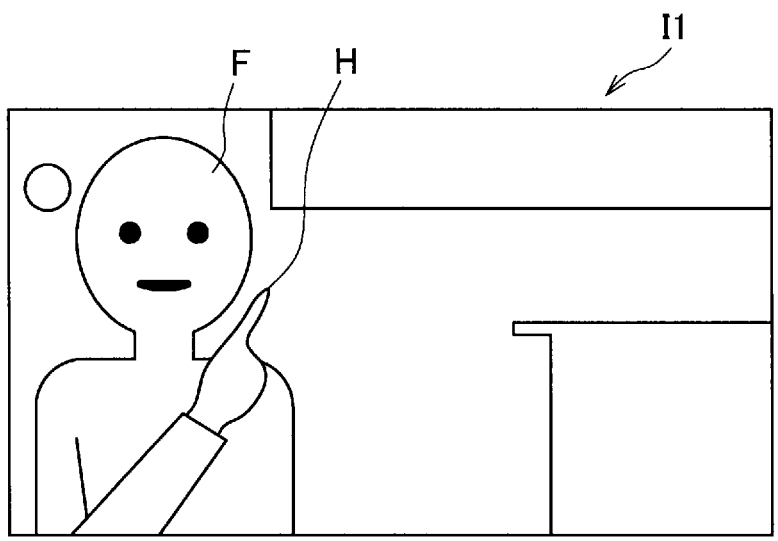
FIG. 6A is a view illustrating an example of generating a superimposed image including a pointing image of a user.

The captured image input unit 202 receives the captured image I1 capturing the user A, from the image capturing apparatus 104 (step S200). The captured image I1 is an image capturing an object positioned in a predetermined range in front of the display apparatus 102, that is, in a range of an angle of view of the image capturing apparatus 104. FIG. 6A illustrates an example of the captured image I1 showing the user's upper body including the finger of the hand which is an example of the pointing object H and the face F, on the viewer's left side, and showing a background image.

Figure 6B:
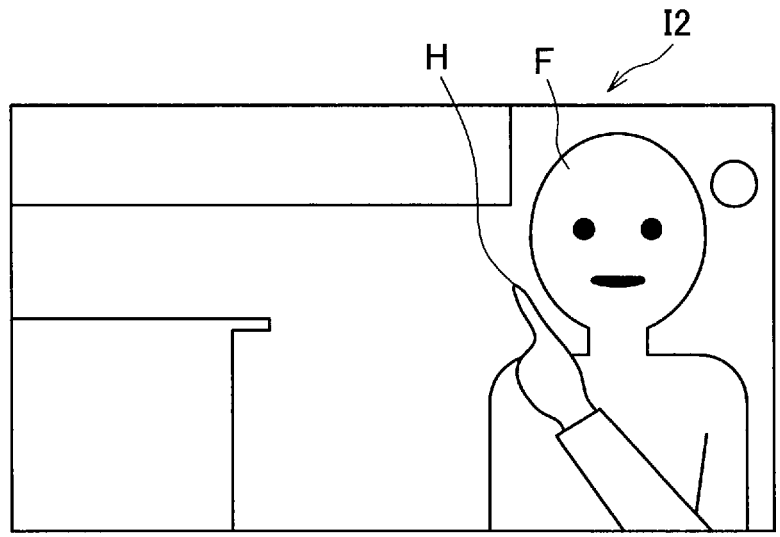
FIG. 6B is a view illustrating an example of generating a superimposed image including a pointing image of a user.

The detecting unit 204 detects the user A's face F from the captured image I1, and generates position information indicating the position of the face F on the captured image I1, from the detection result. The recognizing unit 206 selectively recognizes the user A from the detection result of the face F. The mirror image generating unit 208 generates a mirror image I2 from the captured image I1 (step S202). The mirror image I2 is an image which is a mirror image in which the left and right of the captured image I1 are reversed. FIG. 6B illustrates the mirror image I2 of the captured image I1 illustrated in FIG. 6A. The mirror image I2 includes an image of the user's upper body including the pointing object H and face F on the viewer's right side, and a background image.

Figure 6C:
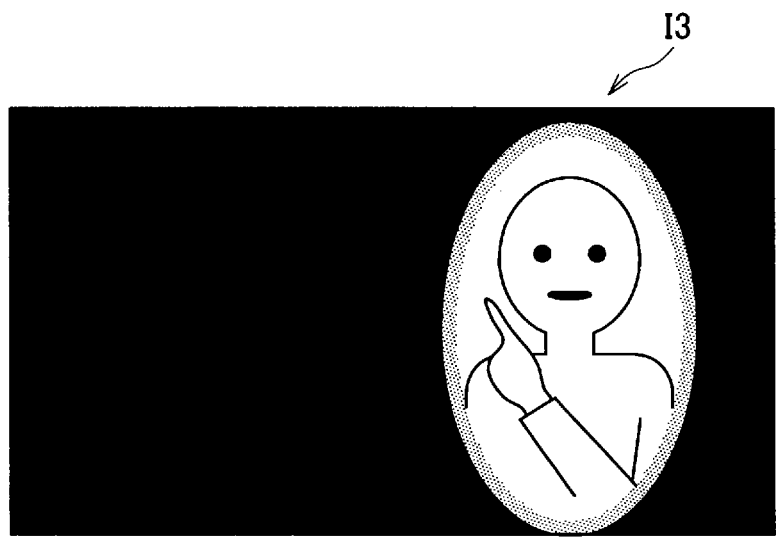
FIG. 6C is a view illustrating an example of generating a superimposed image including a pointing image of a user.

The pointing image generating unit 212 generates the pointing image I3 based on the detection result, position information and mirror image I2 (step S204). The pointing image I3 is an image including information which enables the pointing position which the user A points to by means of the pointing object H to be specified, and information which enables the user A to be identified. FIG. 6C illustrates an example of the pointing image I3 generated from the mirror image I2 illustrated in FIG. 6B. The pointing image I3 illustrated in FIG. 6C is generated by specifying a surrounding area of the user's face F from the mirror image I2 based on position information of the face F. The pointing image I3 is generated by making an image other than the surrounding area transparent based on the mirror image I2, and clipping the image of the surrounding area.

The surrounding area is set as an area in a range of a certain distance from the position of the face F in the up, down, left and right directions, based on, for example, position information of the face F. For example, the surrounding area may be set as an area having a range with the width corresponding to two faces in the left and right directions based on the position of the face F and the height corresponding to the two faces F in the up and down directions. The surrounding area is set by a user terminal or user to include the image of the pointing object H together with the image of the face F.

Figure 6D:
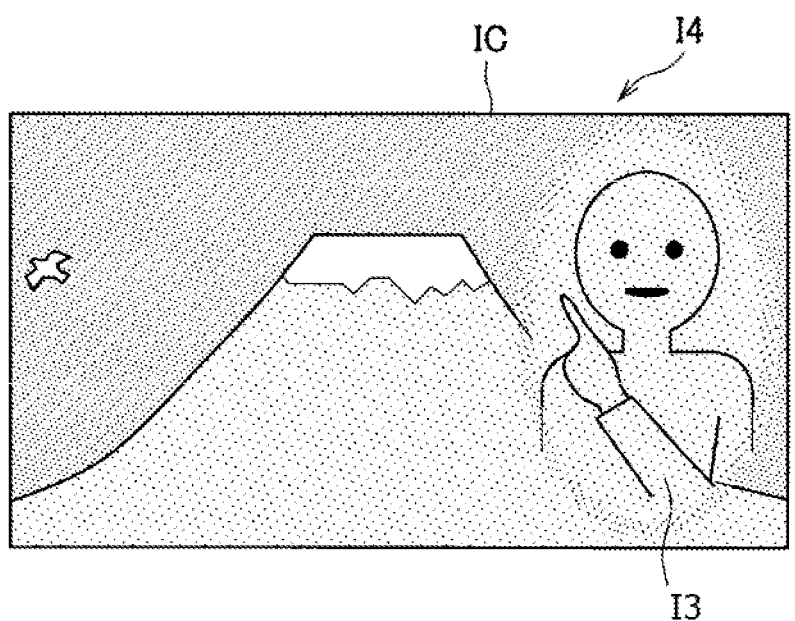
FIG. 6D is a view illustrating an example of generating a superimposed image including a pointing image of a user.

The superimposed image generating unit 214 generates the superimposed image I4 based on the content image IC, pointing image I3 and position information (step S206). The display control unit 216 displays the superimposed image I4 on the display apparatus 102 (step S208). FIG. 6D illustrates an example of the superimposed image I4 in which the pointing image I3 illustrated in FIG. 6B is superimposed on the content image IC. With the superimposed image I4 illustrated in FIG. 6D, by matching the range of the mirror image I2 with the range of the content image IC, the pointing image I3 is superimposed on the content image IC based on position information of the face F. In addition, with the superimposed image I4, the pointing image I3 may be superimposed on the content image IC after increasing display transmittance of the pointing image I3.

Figure 7A:
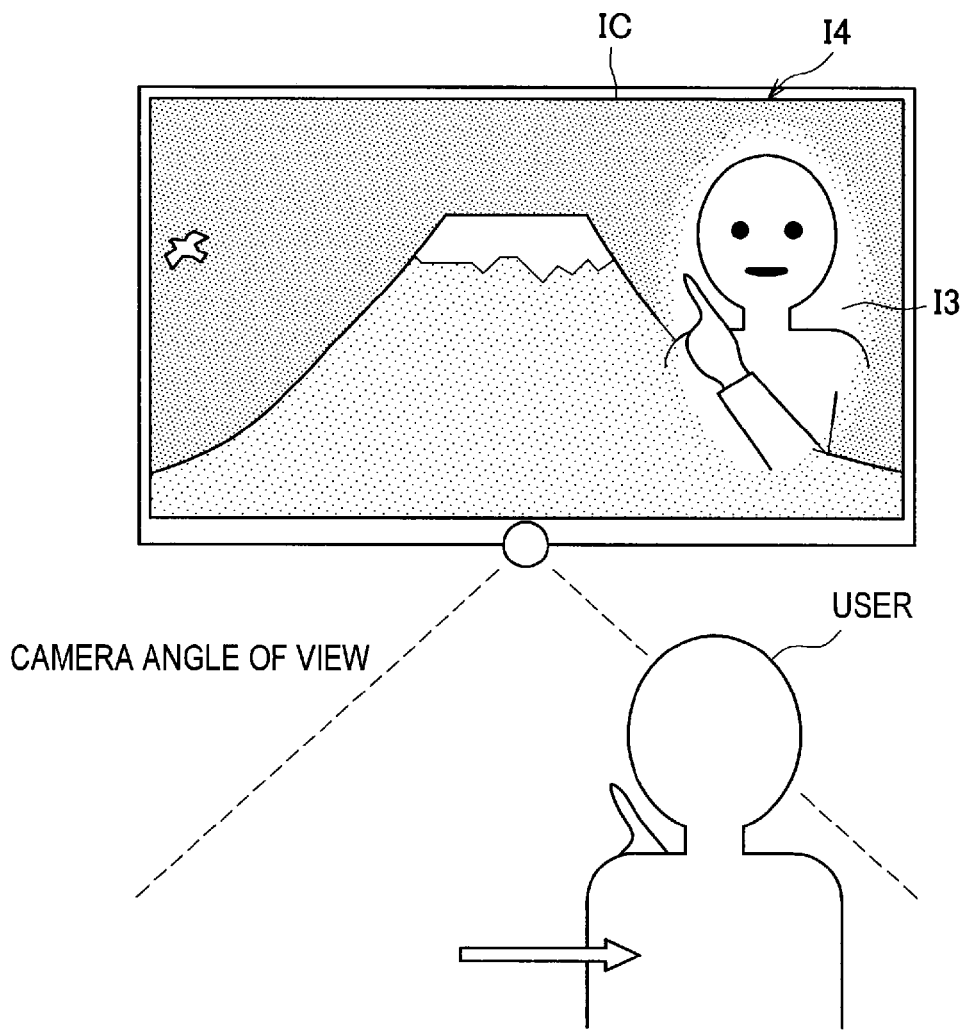
FIG. 7A is a view illustrating a relationship between a user's position in front of a display apparatus and a superimposing position of a pointing image.
Figure 7B:
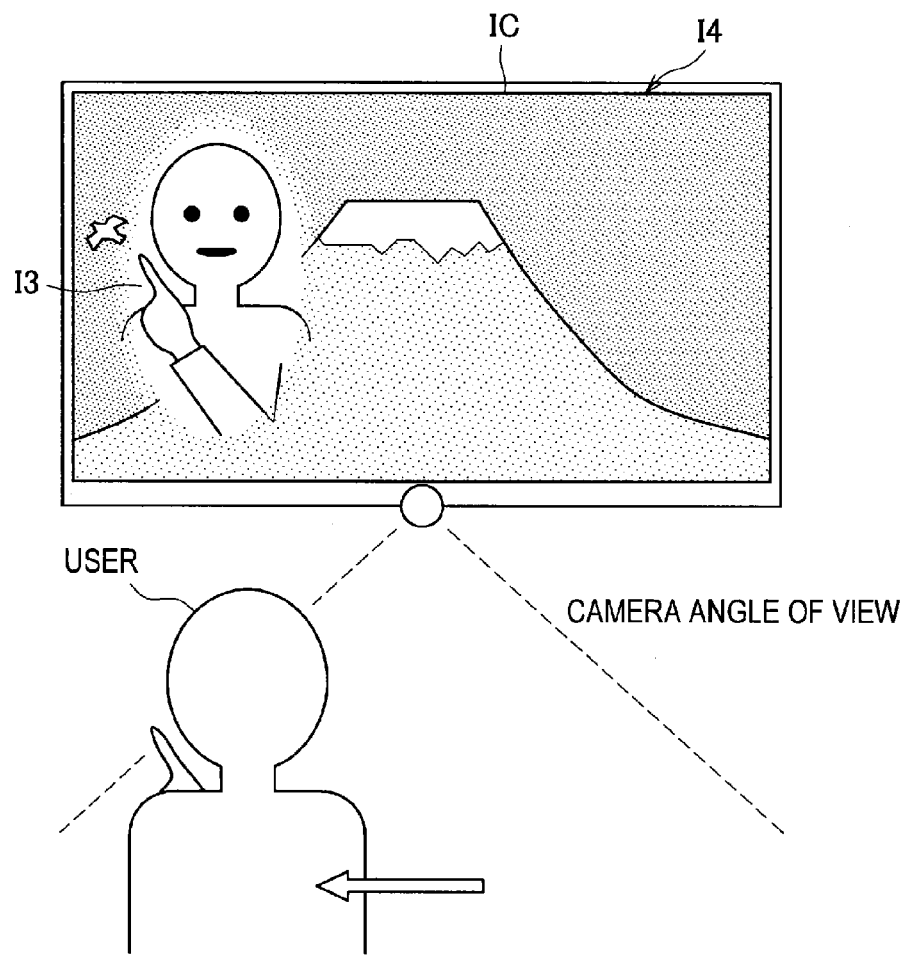
FIG. 7B is a view illustrating a relationship between a user's position in front of a display apparatus and a superimposing position of a pointing image.

FIG. 7A and FIG. 7B are views illustrating the relationship between the user's position in front of the display apparatus 102 and a superimposing position of the pointing image I3. As described above, the superimposed image I4 is generated by superimposing the pointing image I3 generated from the mirror image I2 on the content image IC, based on position information of the face F. Hence, as illustrated in FIG. 7A, when the user moves to the right side in front of the display apparatus 102, the pointing image I3 is superimposed on the right side of the content image IC. By contrast with this, as illustrated in FIG. 7B, when the user moves to the left side in front of the display apparatus 102, the pointing image I3 is superimposed on the left side of the content image IC.

Further, the superimposed image I4 is basically generated by matching the range of the mirror image I2 (or captured image I1), that is, the range of the angle of view of the image capturing apparatus 104 with the range of the content image IC. Consequently, when, as illustrated in FIG. 7A and FIG. 7B, the image capturing apparatus 104 is arranged in the center of the front of the display apparatus 102 and the range of the angle of view of the image capturing apparatus 104 matches with the range of the content image IC, the user is positioned in front of the pointing image I3 superimposed on the content image IC.

By contrast with this, if the range of the angle of view of the image capturing apparatus 104 is twice the range of the content image IC, when the user moves to the right side over the distance x, the pointing image I3 moves to the right side over the distance x/2. Further, if the range of the angle of view of the image capturing apparatus 104 is half the range of the content image IC, when the user moves to the right side over the distance x, the pointing image I3 moves to the right side over the distance 2x.

FIG. 8 to FIG. 11 are views illustrating examples of generating the superimposed image I4. In addition, in FIG. 8 to FIG. 11, the user A points to a predetermined area included in the content image IC (area in which an image of a UFO is shown) by means of the user A's finger which is the pointing object H.

Figure 8:
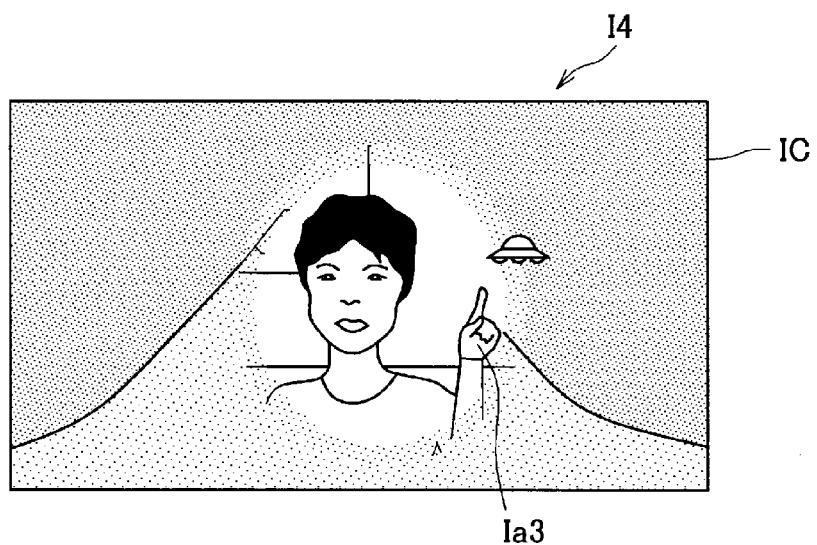
FIG. 8 is a view (1/4) illustrating an example of generating a superimposed image.

Similar to the superimposed image I4 illustrated in FIG. 6D, FIG. 7A and FIG. 7B, with the superimposed image I4 illustrated in FIG. 8, the pointing image Ia3 showing only a surrounding area of the user A's face F is superimposed on the content image IC. Meanwhile, the superimposed image I4 also includes a background image included in the surrounding area.

Figure 9:
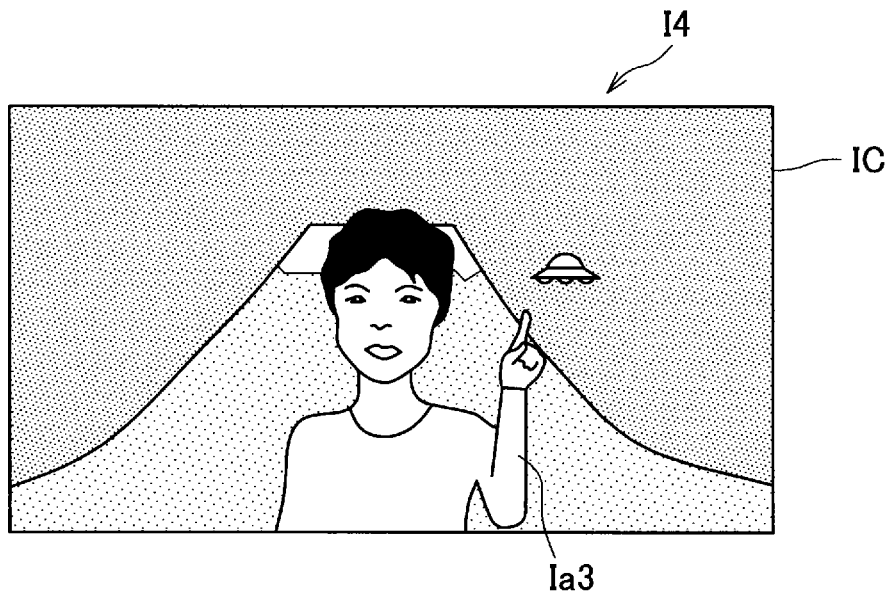
FIG. 9 is a view (2/4) illustrating an example of generating a superimposed image.

With the superimposed image I4 illustrated in FIG. 9, the pointing image Ia3 in which the background image is removed from the mirror image Ia2 is superimposed on the content image IC. The pointing image I3 is generated by specifying an area of the upper body including the user A's face F and pointing object H included in the mirror image Ia2 based on the detection result of the user A's face F, making an image other than the specified area transparent and clipping the image of the specified area.

Figure 10:
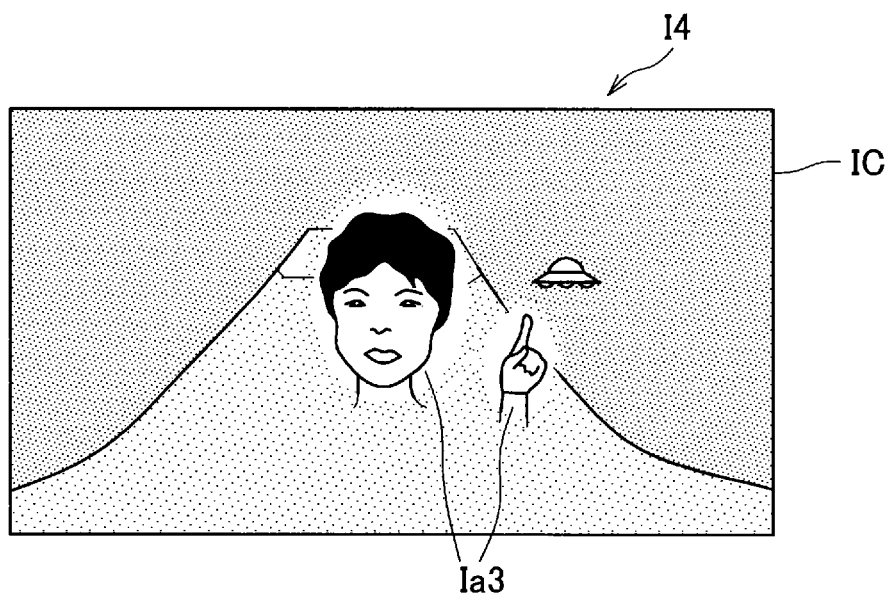
FIG. 10 is a view (3/4) illustrating an example of generating a superimposed image.

With the superimposed image I4 illustrated in FIG. 10, the pointing image Ia3 formed with an image of areas of the user A's face F specified from the mirror image Ia2 and pointing object H is superimposed on the content image IC. The pointing image Ia3 is generated by making the image other than the specified area transparent and clipping the image of the specified area. The pointing image Ia3 is generated by detecting the user A's face F and pointing object H from the captured image Ia1 and generating position information of the user A's face F and pointing object H.

Figure 11:
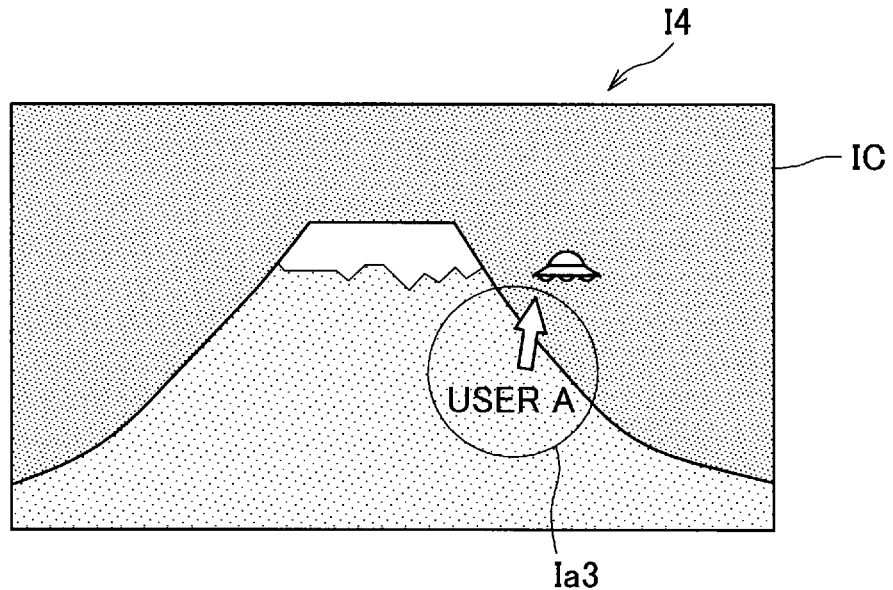
FIG. 11 is a view (4/4) illustrating an example of generating a superimposed image.

With the superimposed image I4 illustrated in FIG. 11, an image showing the pointing position and the pointing image Ia3 including a text indicating the user A's name are superimposed on the content image IC. In this case, the image included in the mirror image Ia2 is not used for the pointing image Ia3. The pointing image Ia3 is generated by detecting the user A's face F and pointing object H from the captured image Ia1 and generating position information of the user A's face F and pointing object H. Further, the user A is recognized from the detection result of the user A's face F, and the text "user A" showing the recognized user A's name is read from the storage unit 218. Similarly, the shape of the pointing object H is recognized from the detection result of the pointing object H, and an image matching the shape of the recognized pointing object H is read from the storage unit 218.

In addition, the pointing image Ia3 may include a character (for example, likeness) assigned to the user A instead of the text showing the user A's name, and may include an image of the area of the user A's face F. Further, the pointing image Ia3 may include an image of the area of the pointing object H instead of the image showing the pointing position.

Next, an operation when it is decided in step S102 that connection to the network is established will be described. The user terminals A and B display a common content image IC. The communication unit 210 of the user terminal A transmits the captured image Ia1 of the user A, detection result, recognition result and position information, to the user terminal B through the communication line 800 (step S104). Further, the communication unit 210 of the user terminal A receives the captured image Ib1 of the user B, detection result, recognition result and position information, from the user terminal B through the communication line 800 (step S106). By this means, the user terminal A acquires the captured image Ib1 of the user B (step S200). In addition, the same processing is also performed in the user terminal B.

Further, similar to the captured image Ia1 of the user A, the mirror image generating unit 208 generates the mirror image Ib2 from the captured image Ib1 of the user B (step S202). Similar to the pointing image Ia3 of the user A, the pointing image generating unit 212 generates the pointing image Ib3 of the user B based on the detection result, selective recognition result, position information and mirror image Ib2 (step S204). The superimposed image generating unit 214 generates the superimposed image I4 based on the content image IC, pointing image Ia3 and position information of the user A and pointing image Ib3 and position information of the user B (step S206). The display control unit 216 displays the superimposed image I4 on the display apparatus 102 (step S208). In addition, the same processing is also performed in the user terminal B.

Figure 12A:
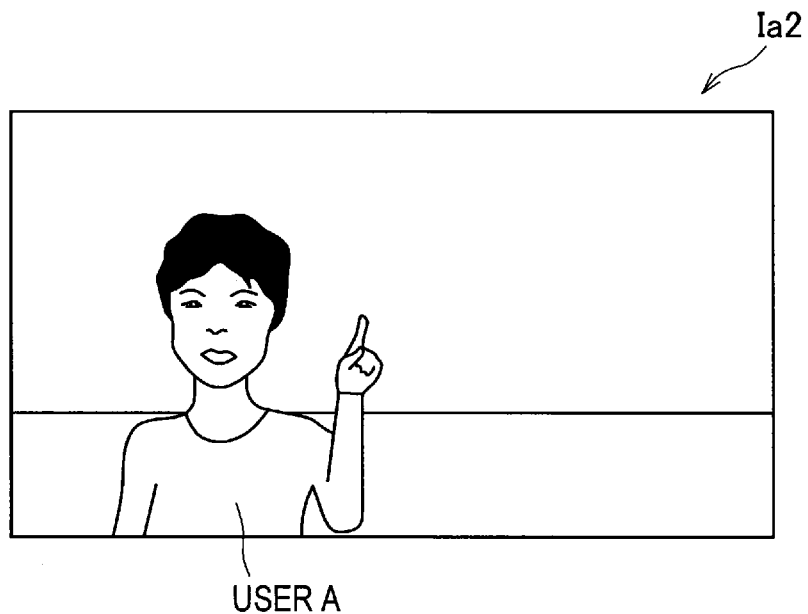
FIG. 12A is a view illustrating an example of generating a superimposed image including pointing images of a plurality of users.
Figure 12B:
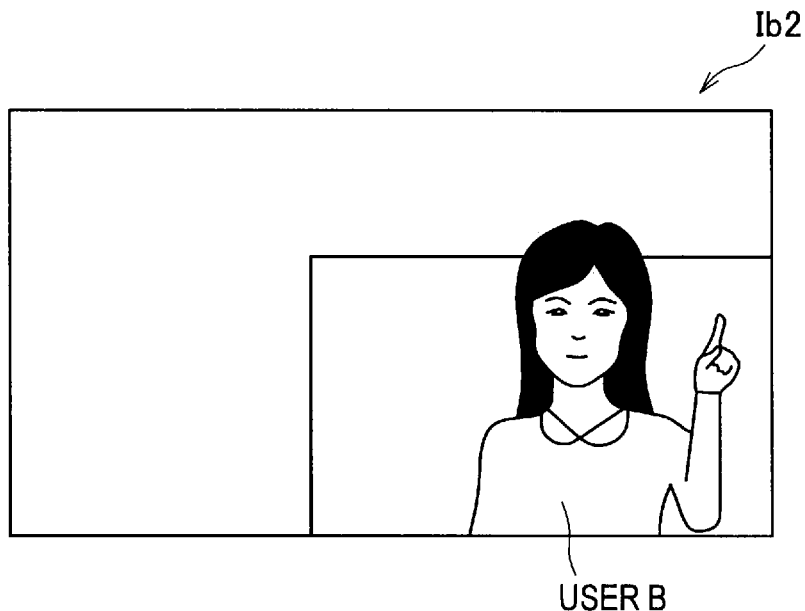
FIG. 12B is a view illustrating an example of generating a superimposed image including pointing images of a plurality of users.
Figure 12C:
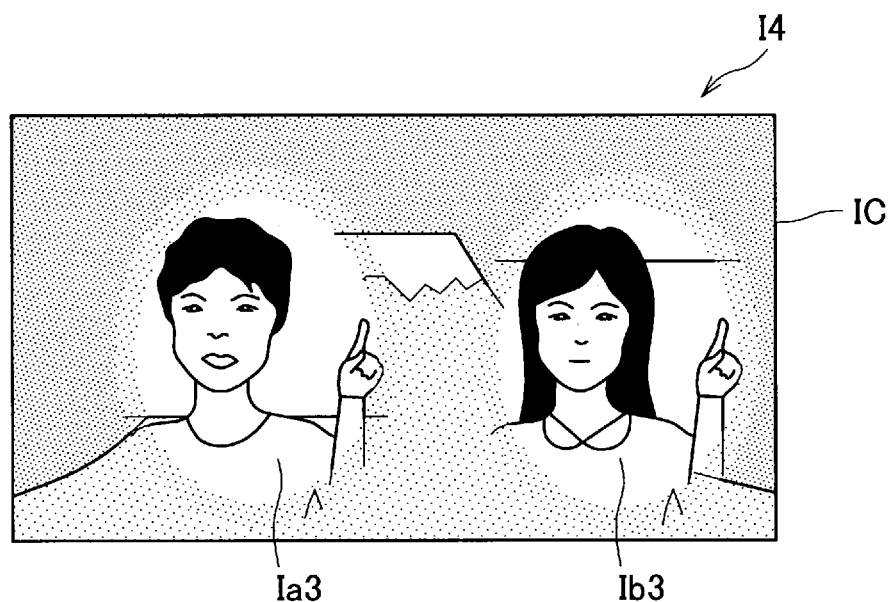
FIG. 12C is a view illustrating an example of generating a superimposed image including pointing images of a plurality of users.

FIG. 12A to FIG. 12C are views illustrating examples of generating the superimposed image I4 including the pointing image Ia3 and Ib3 of the users A and B. FIG. 12A illustrates an image of the upper body including the user A's finger H of the hand and face F, on the viewer's left side, and illustrates the mirror image Ia2 of the captured image Ia1 of the user A including a background image. FIG. 12B illustrates an image of the upper body including the user B's finger H of the hand and face F, on the viewer's right side, and illustrates the mirror image Ib2 of the captured image Ib1 of the user B including a background image.

FIG. 12C illustrates an example of the superimposed image I4 in which the pointing images Ia3 and Ib3 of the users A and B are superimposed on the content image IC. The mirror image Ia2 of the user A includes the image of the user A on viewer's left side, and the mirror image Ib2 of the user B includes the image of user B on the viewer's right side. Hence, with the superimposed image I4, the pointing image Ia3 of the user A is superimposed on the content image IC, on viewer's left side, and the pointing image Ib3 of the user B is superimposed on the content image IC on the viewer's right side. The pointing images Ia3 and Ib3 of the users A and B include information which enables each user to be identified, and can readily enable the pointing position of each user to be specified.

In addition, the superimposed image I4 illustrated in FIG. 12C assumes a case where the width of the content image IC and the widths of the mirror images Ia2 and Ib2 of the user A and user B are the same. Further, although the superimposed image I4 illustrated in FIG. 12C is generated similar to the generation example illustrated in FIG. 8, the superimposed image I4 may be generated similar to the generation examples illustrated in FIG. 9 to FIG. 11.

Figure 13A:
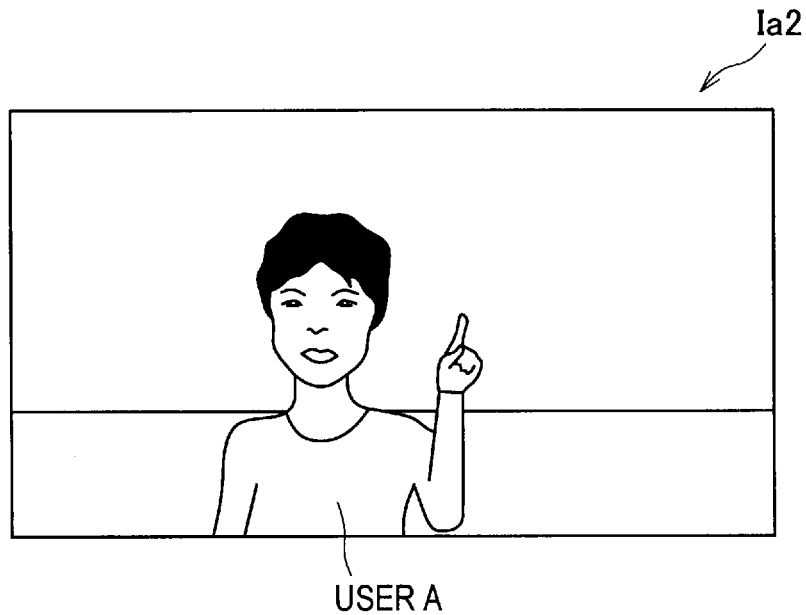
FIG. 13A is a view illustrating a modified example of generating a superimposed image including pointing images of a plurality of users.
Figure 13B:
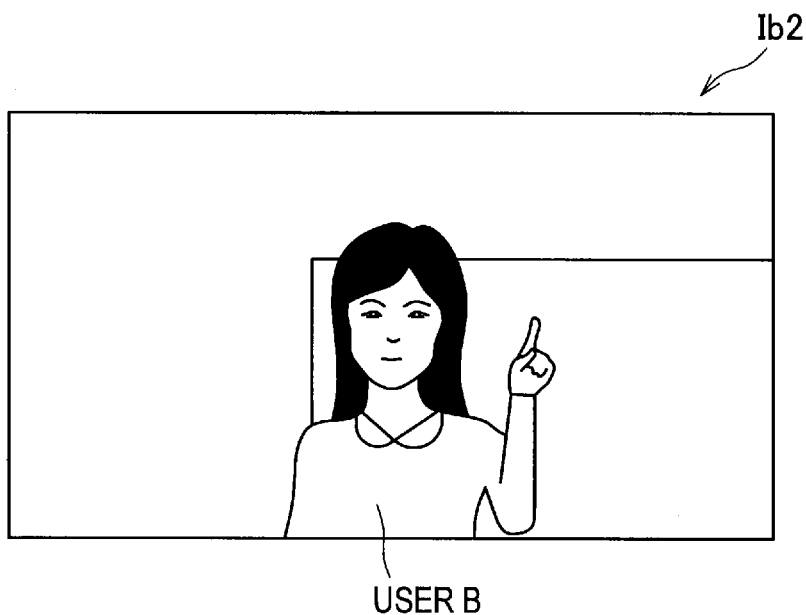
FIG. 13B is a view illustrating a modified example of generating a superimposed image including pointing images of a plurality of users.
Figure 13C:
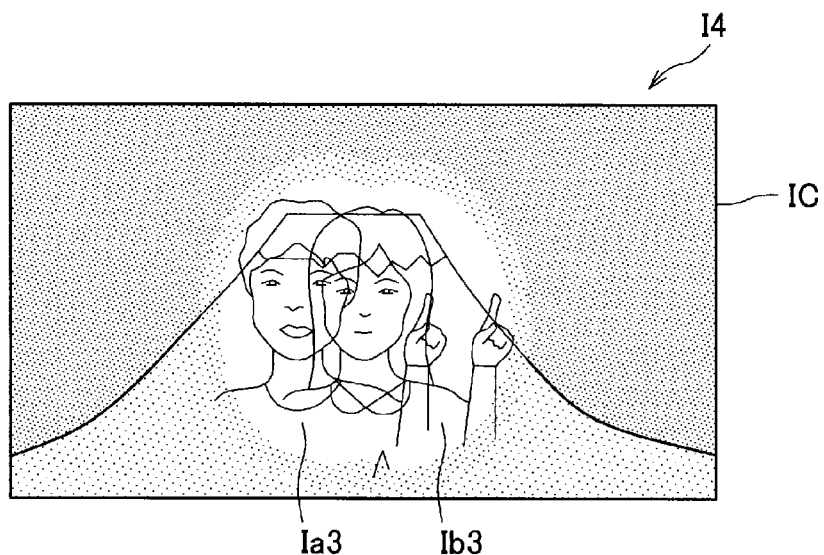
FIG. 13C is a view illustrating a modified example of generating a superimposed image including pointing images of a plurality of users.

FIG. 13A to FIG. 13C are views illustrating modified examples of generating the superimposed image I4 including the pointing images Ia3 and Ib3 of the users A and B. With the modified examples, a case is assumed where the pointing images Ia3 and Ib3 of the users A and B are superimposed on the content image IC overlapping each other. FIG. 13A illustrates the mirror image Ia2 of the user A including the image of the upper body including the finger H of the hand and face F in the center. FIG. 13B illustrates the mirror image Ib2 of the user B including the image of the upper body including the finger H of the hand and face F in the center.

FIG. 13C illustrates an example of the superimposed image I4 in which the pointing images Ia3 and Ib3 of the users A and B are superimposed on the content image IC. The mirror image Ia2 of the user A includes the image of the user A in the center, and the mirror image Ib2 of the user B includes the image of the user B in the center. Therefore, when the superimposed image I4 is generated similar to the generation example illustrated in FIG. 12C, the pointing images Ia3 and Ib3 of the users A and B are overlaid each other, thereby decreasing the visibility. Hence, as illustrated in FIG. 13C, by increasing display transmittance of the pointing images Ia3 and Ib3 of the user A and/or user B, a decrease in the visibility of the pointing images Ia3 and Ib3 which are superimposed overlapping each other is suppressed.

A case has been described above where the range of the angle of view of the image capturing apparatus 104 is matched with the range of the content image IC to generate the superimposed image I4. In this case, when the range of the angle of view is much wider than the range of the content image IC or the user's position is much far from the image capturing apparatus 104, the user is forced to make relatively large movement for the pointing operation. Therefore, it is proposed to set the pointable range which the user can point to without moving, based on the position of the user's face F and match the pointable range with the range of the content image IC instead of the range of the angle of view to generate the superimposed image I4.

Figure 14:
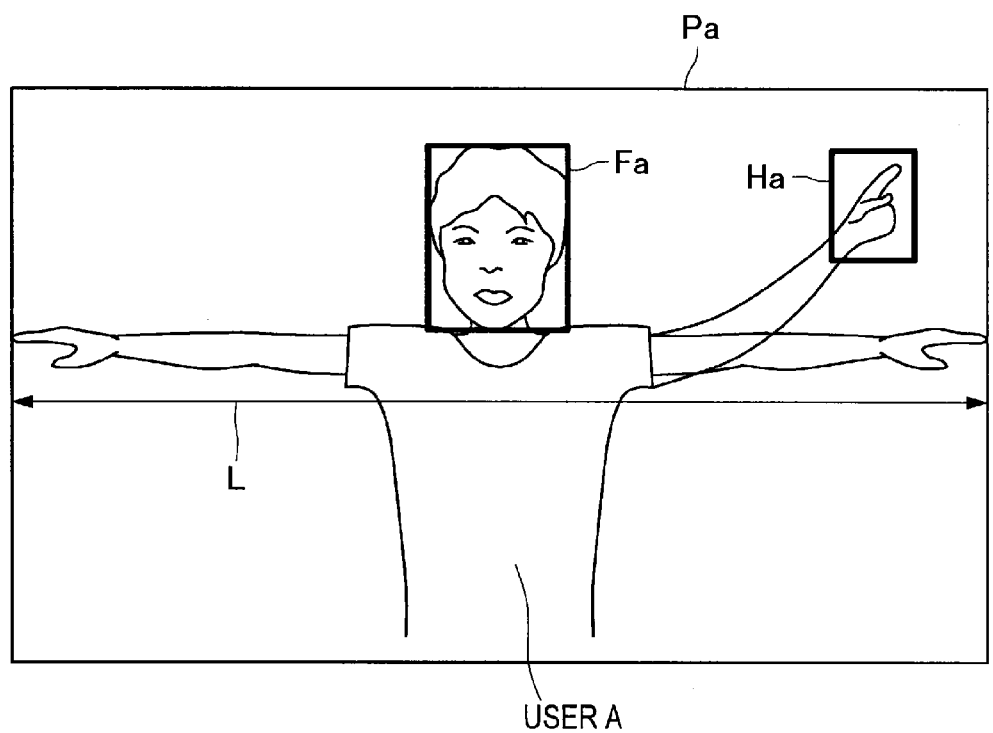
FIG. 14 is a view illustrating a setting example of a pointable range.

FIG. 14 is a view illustrating a setting example of the pointable range. The pointable range illustrated in FIG. 14 is set as a range which can be pointed by the finger of the left hand or right hand in a state where the left arm is extended to the left, upper left or lower left and the right arm is extended to the right, upper right or lower right, based on the position of the user A's face F. For example, with the example illustrated in FIG. 14, the pointable range is set as the range of the width L around the position of the user A's face F. The pointable range may be set by making the user A actually point to the range which the user A is about to point to, and detecting an area Ha of the pointing object H which points to the range. Further, the pointable range may be set as a range with the width corresponding to four faces F in the left and right directions based on the size of an area Fa of the user A's face F and the width corresponding to the two faces F in the up and down directions.

Figure 15A:
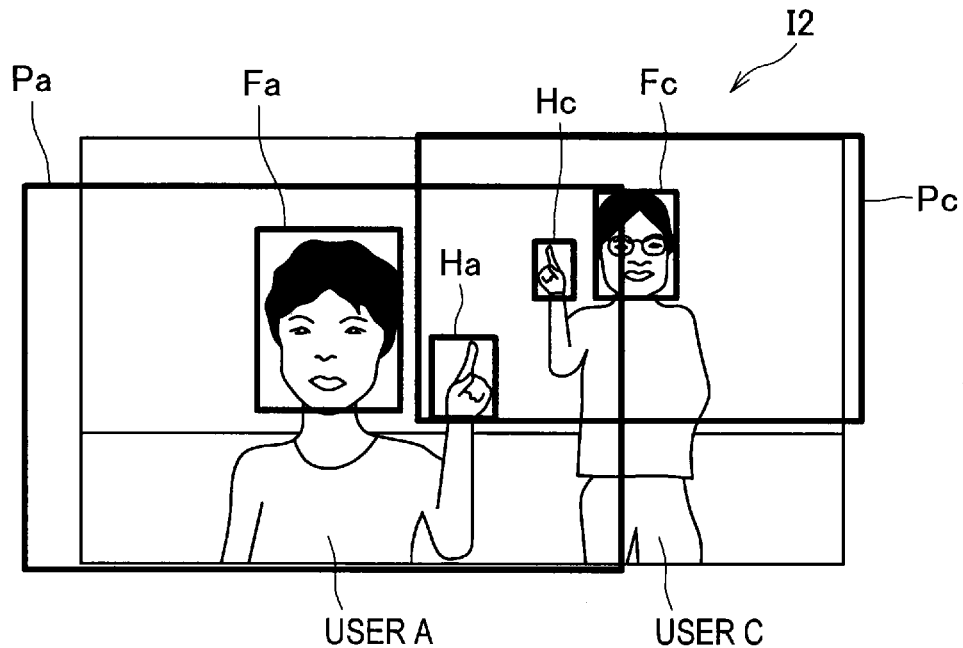
FIG. 15A is a view illustrating an example of a pointing operation based on a pointable range.
Figure 15B:
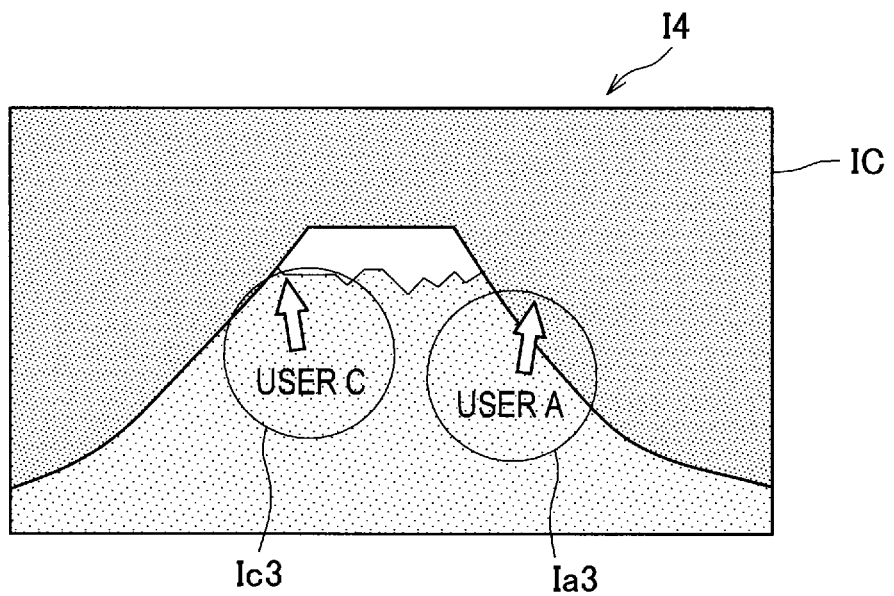
FIG. 15B is a view illustrating an example of a pointing operation based on a pointable range.

FIG. 15A and FIG. 15B are views illustrating examples of the pointing operation based on the pointable range. FIG. 15A illustrates a mirror image I2 of the captured image I1 including the user A and user C. The mirror image I2 includes an image of the user A capturing the upper body including the finger H of the hand and face F, on the viewer's left side, and includes an image of the user C capturing the upper body including the finger H of the hand and face F, on viewer's right side. The user C is positioned farther apart from the image capturing apparatus 104 than the user A.

On the mirror image I2, rectangular frames representing detection areas Fa, Ha, Fc and Hc of the faces F of the users A and C and the pointing objects H, and pointable ranges Pa and Pc are shown. In addition, the rectangular frames of the detection areas Fa, Ha, Fc and Hc and pointable ranges Pa and Pc are shown for ease of description to illustrate processing of the user terminal instead of an image forming part of the mirror image I2. The user A can perform a pointing operation by moving the pointing object H in the pointable range Pa of the user A and the range of the mirror image I2. Similarly, the user C can perform a pointing operation by moving the pointing object H in the pointable range Pc of the user C and the range of the mirror image I2.

Meanwhile, the pointable range Pa of the user A and pointable range Pc of the user C match with the range of the content image IC, respectively. Consequently, the users A and C can point to an arbitrary position in the content image IC by moving the pointing objects H to arbitrary positions in the pointable ranges Pa and Pc of the users A and C without moving the pointing object H in the range of the angle of view of the image capturing apparatus 104.

FIG. 15B illustrates an example of the superimposed image I4 including the pointing images Ia3 and Ic3 of the users A and C. With the mirror image I2 illustrated in FIG. 15A, the user A points to the position closer to the right of the center of the pointable range Pa of the user A, and the user C points to the position closer to the left of the center of the pointable range Pc of the user C. Hence, with the superimposed image I4, the pointing image Ia3 of the user A is superimposed closer to the right of the center of the content image IC, and the pointing image Ic3 of the user C is superimposed closer to the left of the center of the content image IC. Meanwhile, the pointing images Ia3 and Ic3 of the users A and C show the positions which the users A and C point to in the pointable ranges Pa and Pc of the users A and C.

Similarly, when the user A points to the upper right corner of the pointable range Pa of the user A, the pointing image Ia3 of the user A is superimposed on the upper right corner of the content image IC, and, when the user C points to the lower left corner of the pointable range Pc of the user C, the pointing image Ic3 of the user C is superimposed on the lower left corner of the content image IC. In addition, although the superimposed image I4 illustrated in FIG. 15B is generated similar to the generation example illustrated in FIG. 11, the superimposed image I4 may be generated similar to the generation example illustrated in FIG. 10.

Figure 16A:
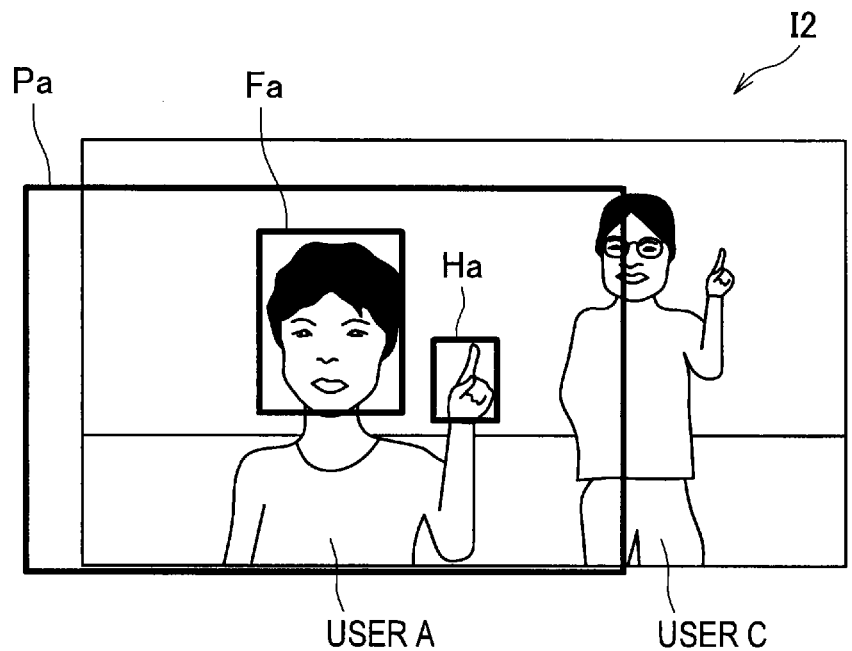
FIG. 16A is a view illustrating another example of a pointing operation based on a pointable range.
Figure 16B:
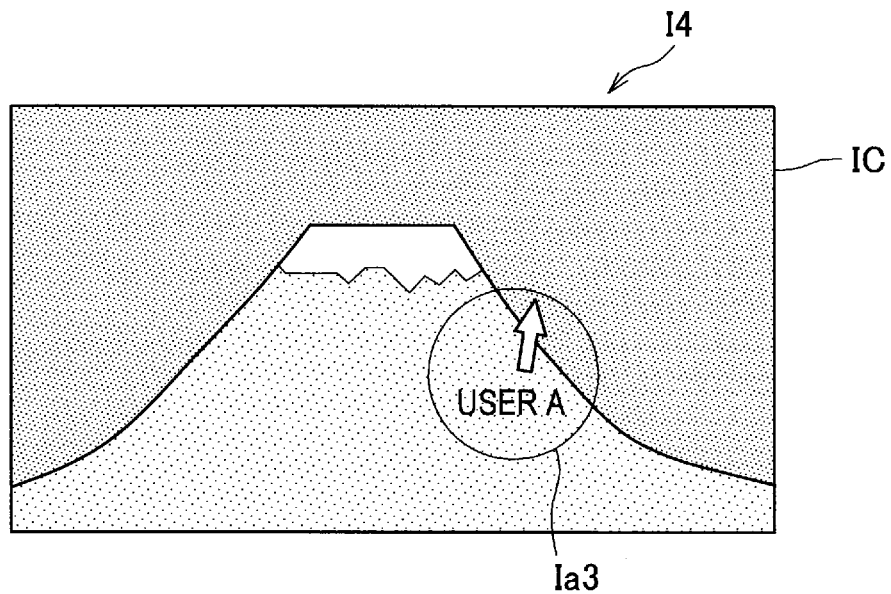
FIG. 16B is a view illustrating another example of a pointing operation based on a pointable range.

FIG. 16A and FIG. 16B are views illustrating other examples of the pointing operation based on the pointable range. Similar to FIG. 15A, FIG. 16A illustrates a mirror image I2 capturing the users A and C. On the mirror image I2, rectangular frames representing detection areas Fa and Ha of the face F and pointing object H of the user A, and the pointable range Pa are shown. With the example illustrated in FIG. 16A, by detecting the users A and C's faces F from the captured image I1 and comparing the sizes of the areas Fa and Fc of the detected faces F, only the user A having a large area of the face F, that is, the user A closest to the image capturing apparatus 104 is allowed to perform the pointing operation.

FIG. 16B illustrates an example of the superimposed image I4 including the pointing image Ia3 of the user A. With the mirror image I2 illustrated in FIG. 16A, the user A points to the position closer to the right of the center of the pointable range Pa of the user A. Hence, with the superimposed image I4, the pointing image Ia3 of the user A is superimposed closer to the right of the center of the content image IC.

In addition, instead of the user closest to the image capturing apparatus 104, only the user farthest from the image capturing apparatus 104 or the user positioned at an adequate distance from the image capturing apparatus 104 may be allowed to perform the pointing operation. Further, when a plurality of faces F are detected, only a predetermined number of users positioned at adequate distances from the image capturing apparatus 104 may be allowed to perform the pointing operation.

A case has been described above where the superimposed image I4 by detecting the position of the pointing object H. By the way, the user wants to superimpose the pointing image I3 of a different mode on the content image IC depending on cases. Hence, it is proposed to generate the superimposed image I4 including the pointing image I3 of a different mode by detecting the position of the pointing object H and recognizing the shape of the pointing object H. By this means, by changing the mode of the pointing image I3, it is possible to, for example, transmit additional information to other users and, thereby, improve convenience upon the pointing operation.

Figure 17:
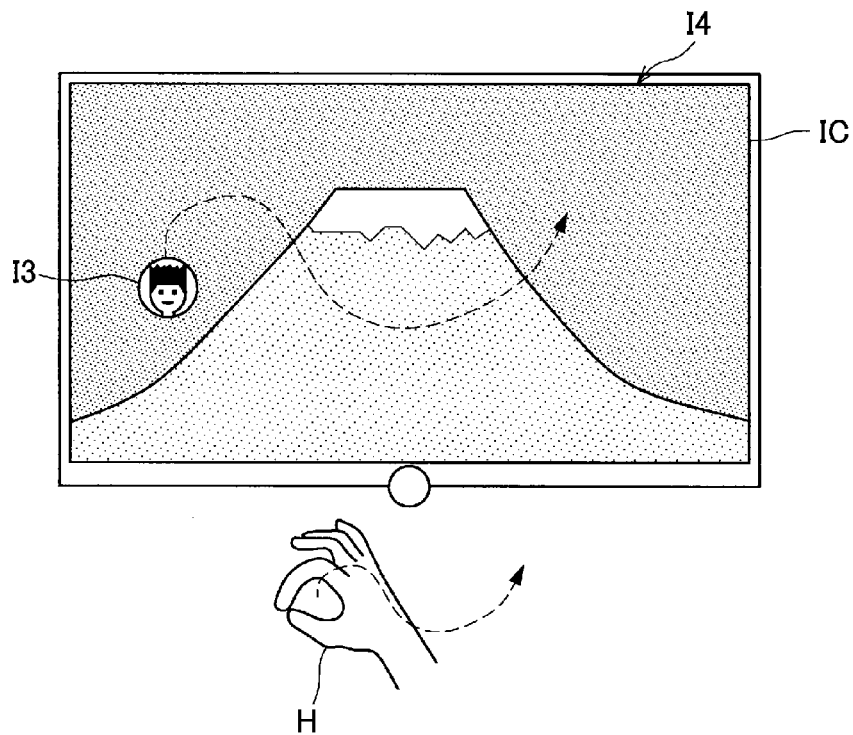
FIG. 17 is a view (1/2) illustrating an example of a superimposed image including a pointing image of a different mode.
Figure 18A:
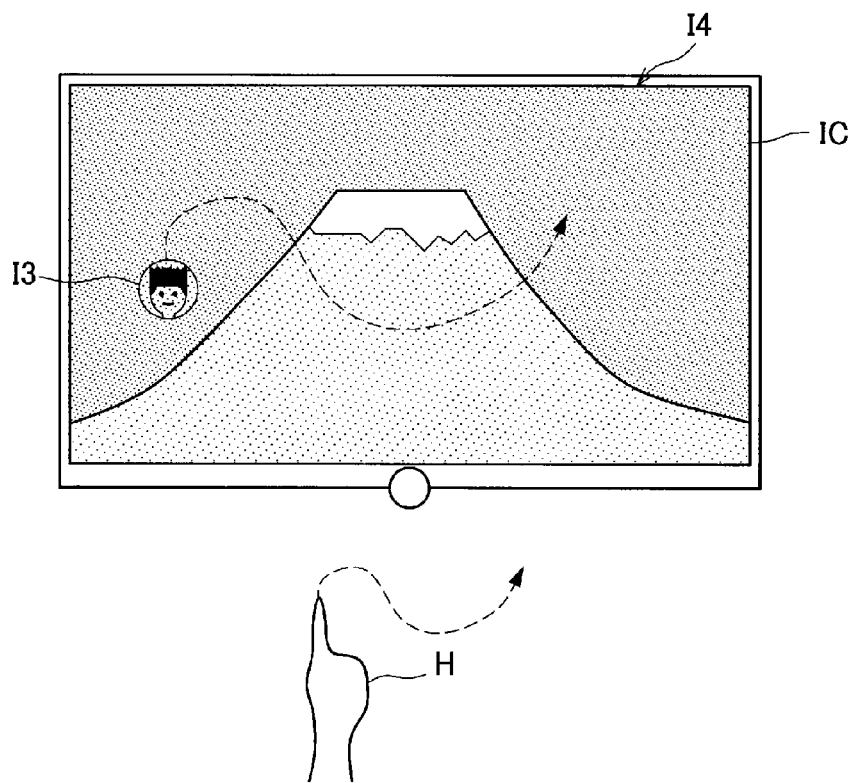
FIG. 18A is a view (2/2) illustrating an example of a superimposed image including a pointing image of a different mode.
Figure 18B:
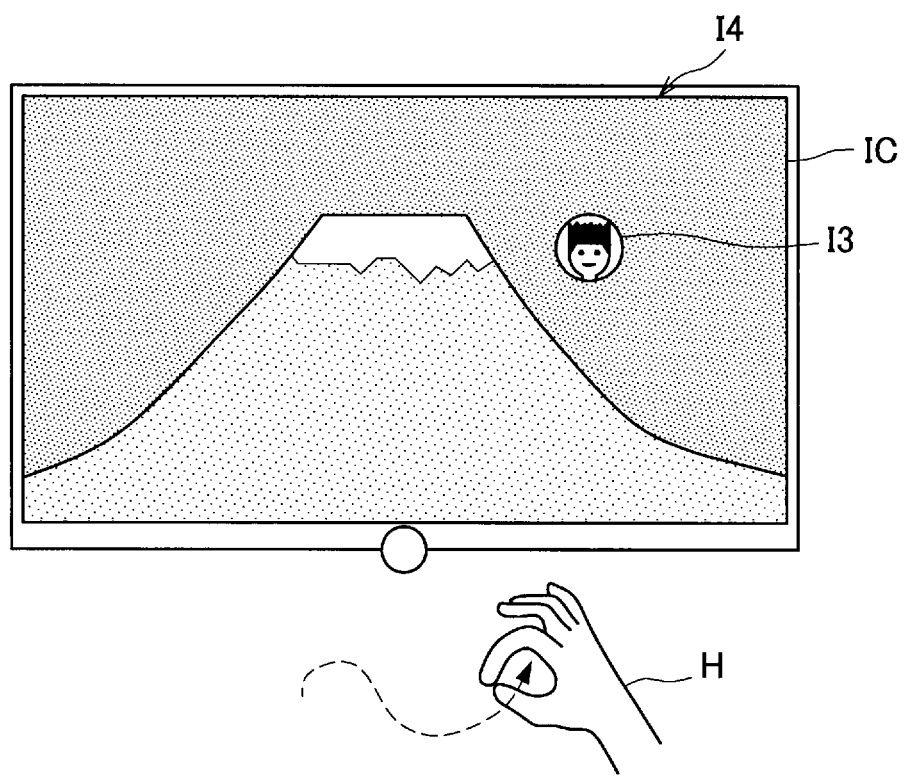
FIG. 18B is a view (2/2) illustrating an example of a superimposed image including a pointing image of a different mode.

FIG. 17 to FIG. 18B are views illustrating examples of the superimposed image I4 including the pointing image I3 of a different mode. With the example illustrated in FIG. 17, the user forms a ring by bending the thumb and forefinger and moves the ring from the left to the right in front of the display apparatus 102 drawing a wave. Then, the user terminal recognizes the shape of the pointing object H, and generates the superimposed image I4 including the pointing image I3 showing the character corresponding to the user according to a mode matching the recognized shape. Meanwhile, the pointing image I3 shows the character according to a mode which enables clear recognition of the character. With the superimposed image I4, as indicated by a dotted line in FIG. 17, the pointing image I3 moves on the content image IC in association with movement of the pointing object H.

By contrast with this, with the examples illustrated in FIG. 18A and FIG. 18B, as illustrated in FIG. 18A, the user first moves the forefinger from the left to the right in front of the display apparatus 102 drawing a wave in a state where the forefinger is stretched. Then, the user terminal recognizes the shape of the pointing object H, and generates the superimposed image I4 including the pointing image I3 representing the character according to a mode different from FIG. 17. Meanwhile, the pointing image I3 shows the character according to a mode which does not enable clear recognition of the character.

Further, as illustrated in FIG. 18B, the user moves the pointing object H and then makes a ring by bending the thumb and forefinger. Then, the user terminal recognizes the change of the shape of the pointing object H, and generates the superimposed image I4 including the pointing image I3 representing the character according to the same mode as in FIG. 17. In addition, although cases have been described in FIG. 17 to FIG. 18B where two different shapes are recognized, three or more different shapes may be recognized.

As described above, with the television conference system according to an embodiment of the disclosure, each user terminal detects the user's face F from the captured image I1 and generates information indicating the position of the face F, generates the pointing image I3 including information which enables the pointing position of the user to be specified and identification information of the user, and generates and displays the superimposed image I4 in which the pointing image I3 is superimposed on the content image IC based on position information. Further, at least the captured image I1 is transmitted to other user terminals to display the same superimposed image I4 on the other user terminals. By this means, between users utilizing a plurality of user terminals, it is possible to readily point to an arbitrary position on content information which is commonly displayed, for other users without a complicated manipulation or operation.

It should be understood by those skilled in the art that various modifications, combinations, sub-combinations and alterations may occur depending on design requirements and other factors insofar as they are within the scope of the appended claims or the equivalents thereof.

Figure 19:
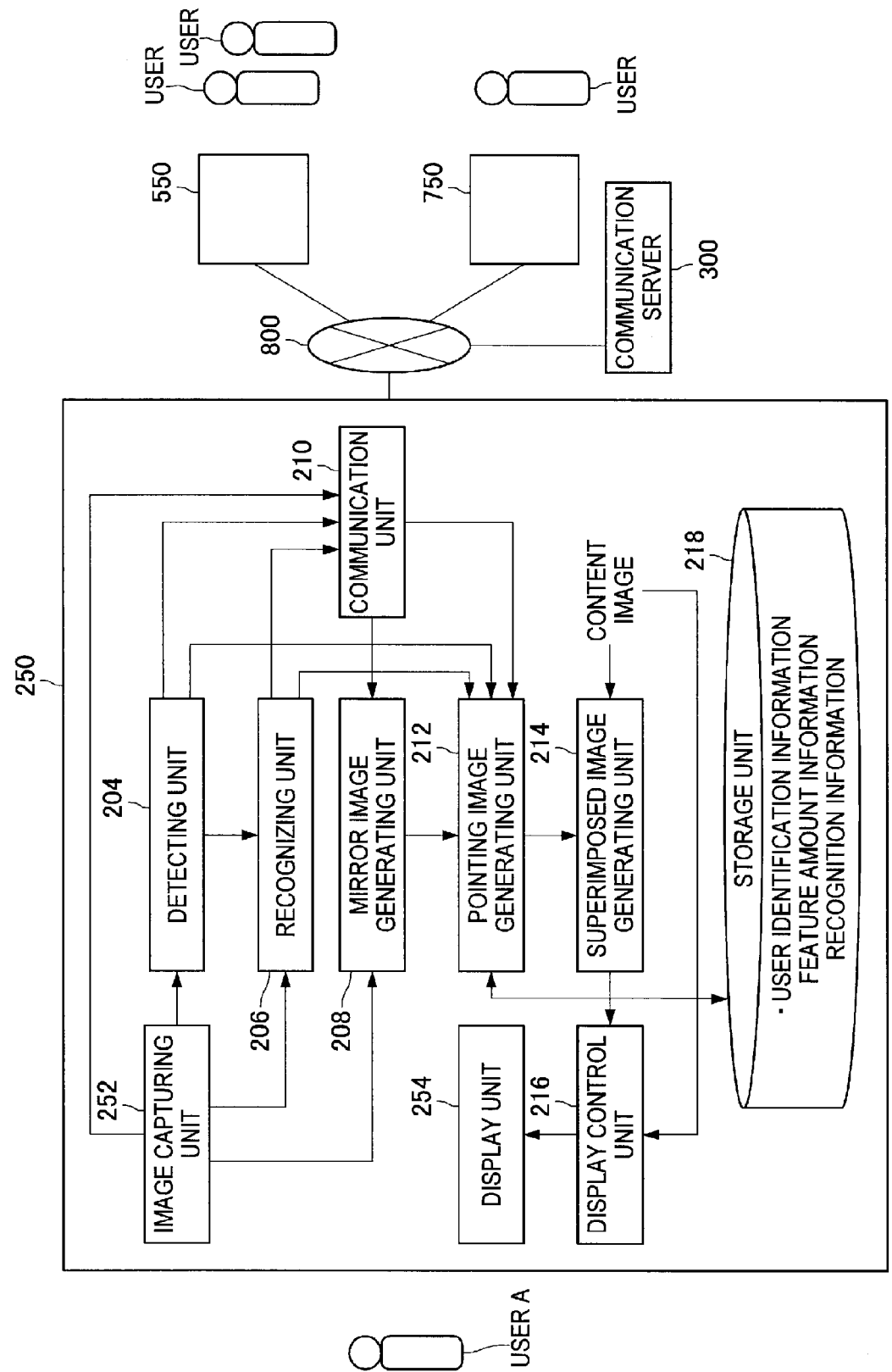
FIG. 19 is a block diagram illustrating another configuration of a television conference system.

For example, a case has been described with the above embodiment where the user terminal includes the display system 100 and information processing apparatus 200. However, as illustrated in FIG. 19, the user terminal may include an information processing apparatus 250 in which a configuration of the display system 100 is mounted. In this case, the information processing apparatus 250 has an image capturing unit 252 (image capturing apparatus) and a display unit 254 (display apparatus) in addition to the configuration of the information processing apparatus 200 illustrated in FIG. 1. In addition, there may be display system mount-type information processing apparatuses and separate-type information processing apparatuses in the television conference system in a mixed manner.

The invention claimed is:

1. An information processing apparatus comprising:
   a detecting unit to detect a pointing object of a user in a captured image;
   a generation unit to generate pointing information based on detection of the pointing object by the detecting unit, wherein the pointing information includes
   a position of the pointing object in a pointable range set based on the user in the captured image, and
   user information; and
   a communication unit to transmit the pointing information to an external apparatus.

2. The apparatus of claim 1, wherein the pointing information includes a portion of the captured image corresponding to the detected pointing object.

3. The apparatus of claim 1 further comprising:
   an image capture unit to capture the captured image.

4. The apparatus of claim 1, wherein the pointable range is based on a position of the user away from an image capture unit that captures the captured image.

5. The apparatus of claim 1, wherein the detecting unit detects a shape of the pointing object.

6. The apparatus of claim 1, in which the user information is identification information which identifies the user.

7. The apparatus of claim 1, in which the user information includes an image of a face of the user.

8. An information processing apparatus comprising:
   a communication unit to receive from an external apparatus pointing information including information of a pointing object of a user in a captured image, wherein the pointing information includes a position of the pointing object in a pointable range set based on the user in the captured image, and user information; and
   a generation unit to control display on a display screen of a pointing image corresponding to the pointing information superimposed on a content image.

9. The apparatus of claim 8, wherein the pointing information includes a portion of the captured image corresponding to the pointing object, and the portion of the captured image is superimposed as the pointing image.

10. The apparatus of claim 8, wherein the determined image is a cursor image.

11. The apparatus of claim 8, wherein the pointing information indicates a shape of the pointing object.

12. The apparatus of claim 11, wherein the pointing image is in accordance with the shape of the pointing object.

13. The apparatus of claim 11, wherein the pointing image indicates a user corresponding to the pointing object based on the shape of the pointing object.

* * * * *